US012641380B2

(12) United States Patent
Solum

(10) Patent No.: US 12,641,380 B2
(45) Date of Patent: May 26, 2026

(54) ANTENNA USED IN CONJUNCTION WITH THE CONDUCTORS FOR AN AUDIO TRANSDUCER

(71) Applicant: Starkey Laboratories, Inc., Eden Prairie, MN (US)

(72) Inventor: Jeffrey Paul Solum, Greenwood, MN (US)

(73) Assignee: Starkey Laboratories, Inc., Eden Prairie, MN (US)

(*) Notice: Subject to any disclaimer, the term of this patent is extended or adjusted under 35 U.S.C. 154(b) by 305 days.

(21) Appl. No.: 18/299,167

(22) Filed: Apr. 12, 2023

(65) Prior Publication Data

US 2023/0379641 A1 Nov. 23, 2023

Related U.S. Application Data

(63) Continuation of application No. 16/948,903, filed on Oct. 5, 2020, now Pat. No. 11,653,157, which is a continuation of application No. 15/369,122, filed on Dec. 5, 2016, now Pat. No. 10,798,496, which is a continuation of application No. 14/518,393, filed on Oct. 20, 2014, now Pat. No. 9,516,432, which is a continuation of application No. 12/027,151, filed on Feb. 6, 2008, now Pat. No. 8,867,765.

(51) Int. Cl.

| | |
|---|---|
| ***H04R 25/00*** | (2006.01) |
| ***H01Q 1/24*** | (2006.01) |
| ***H01Q 1/27*** | (2006.01) |

(52) U.S. Cl.

CPC ........... *H04R 25/554* (2013.01); *H01Q 1/241* (2013.01); *H01Q 1/273* (2013.01); *H04R 2225/021* (2013.01); *H04R 2225/0216* (2019.05); *H04R 2225/023* (2013.01); *H04R 2225/025* (2013.01); *H04R 2225/51* (2013.01)

(58) Field of Classification Search

CPC ........ H01Q 1/241; H01Q 1/273; H04R 25/00; H04R 2225/021; H04R 2225/0216; H04R 2225/023; H04R 2225/025; H04R 2225/51

See application file for complete search history.

(56) References Cited

U.S. PATENT DOCUMENTS

| | | | | |
|---|---|---|---|---|
| 7,110,562 | B1 * | 9/2006 | Feeley | H04R 25/607 381/328 |
| 7,373,169 | B2 * | 5/2008 | Yoshino | H01Q 1/273 379/22 |
| 8,648,761 | B2 * | 2/2014 | Ishibana | H01Q 19/26 381/381 |

OTHER PUBLICATIONS

"U.S. Appl. No. 16/948,903, Advisory Action mailed Aug. 2, 2022", 5 pgs.
"U.S. Appl. No. 16/948,903, Final Office Action mailed May 24, 2022", 11 pgs.

(Continued)

*Primary Examiner* — Brian Ensey
(74) *Attorney, Agent, or Firm* — Schwegman Lundberg & Woessner, P.A.

(57) ABSTRACT

A hearing assistance device to provide sound to the ear of a user, the device comprising a housing, hearing assistance electronics enclosed in the housing, an acoustic transducer adapted to be worn in the ear, a cable assembly adapted to connect the acoustic transducer to the hearing assistance electronics, a wireless communications receiver connected to the hearing assistance electronics, and an antenna comprising one or more conductors forming at least a portion of the cable assembly.

15 Claims, 15 Drawing Sheets

(56) References Cited

OTHER PUBLICATIONS

"U.S. Appl. No. 16/948,903, Non Final Office Action mailed Nov. 17, 2021", 16 pgs.
"U.S. Appl. No. 16/948,903, Notice of Allowance mailed Jan. 10, 2023", 8 pgs.
"U.S. Appl. No. 16/948,903, Preliminary Amendment filed Jan. 14, 2021", 6 pgs.
"U.S. Appl. No. 16/948,903, Response filed Feb. 15, 2022 to Non Final Office Action mailed Nov. 17, 2021", 12 pgs.
"U.S. Appl. No. 16/948,903, Response filed Jul. 22, 2022 to Final Office Action mailed May 24, 2022", 8 pgs.

* cited by examiner

ANTENNA USED IN CONJUNCTION WITH THE CONDUCTORS FOR AN AUDIO TRANSDUCER

PRIORITY APPLICATION

This application is a continuation of U.S. patent application Ser. No. 16/948,903, filed Oct. 5, 2020, which is a continuation of U.S. patent application Ser. No. 15/369,122, filed Dec. 5, 2016, now issued as U.S. Pat. No. 10,798,496; which is a continuation of U.S. patent application Ser. No. 14/518,393, filed Oct. 20, 2014, now issued as U.S. Pat. No. 9,516,432, which is a continuation of U.S. patent application Ser. No. 12/027,151, filed Feb. 6, 2008, now issued as U.S. Pat. No. 8,867,765, each of which applications are incorporated herein by reference in their entirety.

FIELD OF TECHNOLOGY

This document relates to hearing assistance devices and more particularly to electronic wireless communications using conductors of hearing assistance devices.

BACKGROUND

Hearing assistance devices, such as hearing aids, can provide adjustable operational modes or characteristics that improve the performance of the hearing assistance device for a specific person or in a specific environment. Some of the operational characteristics are volume control, tone control, and selective signal input. These and other operational characteristics can be programmed into a hearing aid. A programmable hearing aid can be programmed through connections to the hearing aid and by wirelessly communicating with the hearing aid. Hearing assistance devices present limited space and power design options. The placement and design of any components must be made with economy.

SUMMARY

This document provides methods and apparatus for hearing assistance devices with wireless electronics connected to acoustic transducer conductors for use as antennas. In one embodiment, a hearing assistance device is provided including a behind-the-ear housing, hearing assistance electronics enclosed in the housing, an acoustic transducer adapted to be worn in the ear, a cable assembly mechanically connected to the BTE housing and electrically connecting the acoustic transducer to the hearing assistance electronics, wireless electronics connected to the hearing assistance electronics and an antenna comprising one or more conductors forming at least a portion of the cable assembly. In one embodiment, a hearing assistance device is provided including a behind-the-ear housing, hearing assistance electronics enclosed in the housing, a receiver, a cable assembly connecting the receiver to the hearing assistance electronics, a wireless communications receiver connected to the hearing assistance electronics and an antenna comprising one or more conductors forming at least a portion of the cable assembly. In various embodiments, the hearing assistance device includes a wireless communications transmitter. In one embodiment, a method of manufacturing a hearing assistance device is provided, the method including coupling an acoustic transducer to hearing assistance electronics using two or more conductors and coupling wireless communication electronics to at least one of the two or more conductors.

This Summary is an overview of some of the teachings of the present application and is not intended to be an exclusive or exhaustive treatment of the present subject matter. Further details about the present subject matter are found in the detailed description and the appended claims. The scope of the present invention is defined by the appended claims and their legal equivalents.

DETAILED DESCRIPTION

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various"

embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Figure 1:
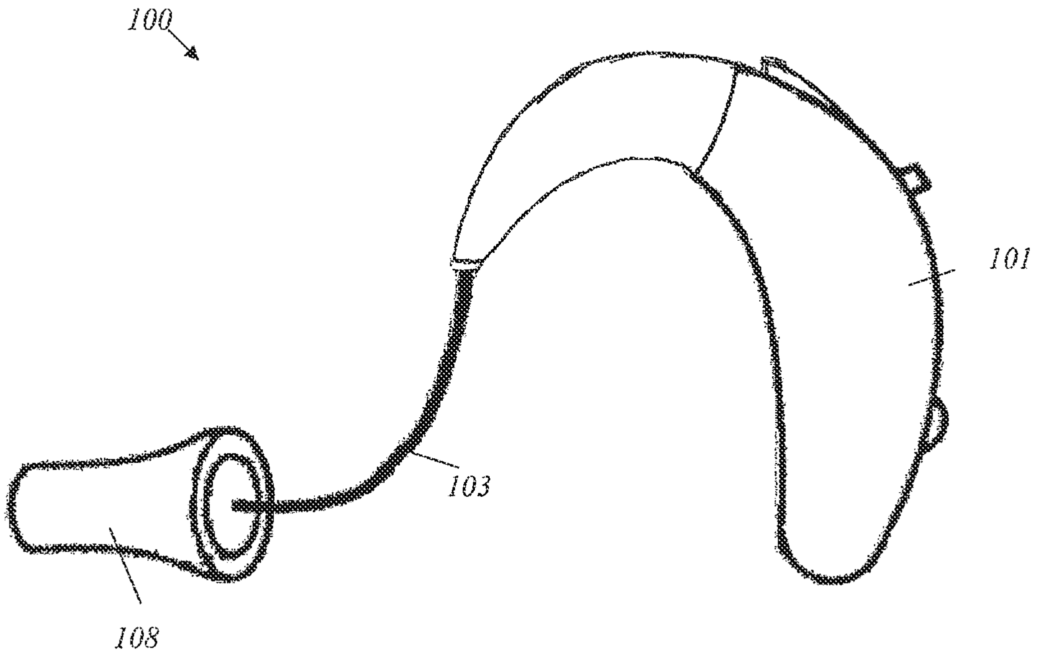
FIG. 1 illustrates one embodiment of a hearing assistance device according to the present subject matter.

FIG. 1 illustrates one embodiment of a hearing assistance device 100 according to the present subject matter. The illustrated hearing assistance device includes a first housing 101, a second housing 108 and a cable assembly 103, including conductors, connecting electrical components enclosed in the first housing 101 to electrical components attached to the second housing 108. In the illustrated embodiment, the first housing is adapted to be worn on the ear of a user and the second housing 108 is adapted to be positioned in an ear canal of the user. In various embodiments, one or more of the conductors in the cable assembly 103 are used as an antenna for electronic wireless communications. In various embodiments, the cable assembly 103 include a tube, protective insulation or a tube and protective insulation. In various embodiments, the cable assembly 103 is formable so as to adjust the relative position of the first and second housing according to the comfort and preference of the user.

Figure 2:
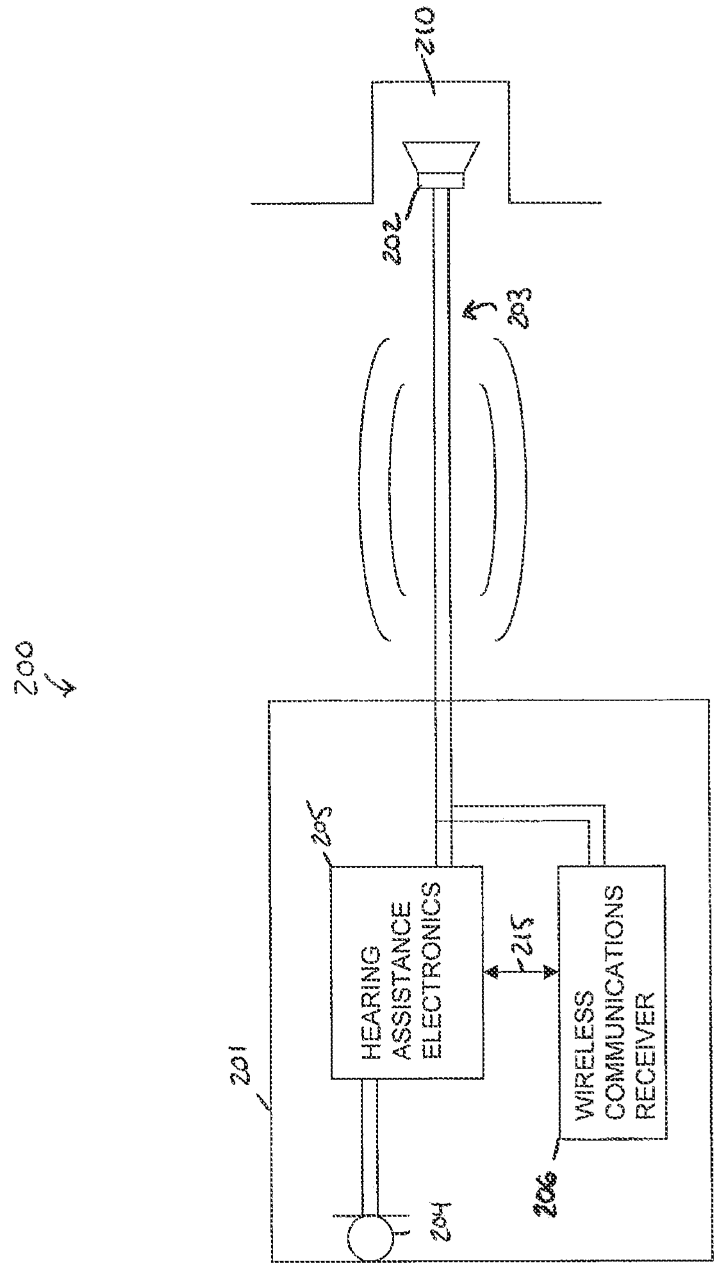
FIG. 2 illustrates a block diagram of a hearing assistance device with wireless communication receiver according to one embodiment of the present subject matter.

FIG. 2 illustrates a block diagram of a hearing assistance device 200 with wireless communications receiver according to the present subject matter. The illustrated embodiment includes a first housing 201, an acoustic receiver 202, or speaker, positioned in the ear canal 210 of a wearer and conductors 203 coupling the receiver to the first housing 201 and the electronics enclosed therein. The electronics enclosed in the first housing include a microphone 204, hearing assistance electronics 205 and a wireless communication receiver 206. In various embodiments, the hearing assistance electronics include a processor and memory components. The memory component stores program instructions for the processor. The program instructions include functions allowing the processor and other components to process audio received by the microphone 204 and transmit processed audio signals to the speaker 202. The speaker emits the processed audio signal as sound in the user's ear canal. In various embodiments, the hearing assistance electronics includes functionality to amplify, filter, limit, condition or a combination thereof, the sounds received using the microphone 204.

In the illustrated embodiment of FIG. 2, the wireless communications receiver 206 is connected to the hearing assistance electronics 205 and the conductors 203 connecting the hearing assistance electronics 205 and the speaker 202. In various embodiments, the hearing assistance electronics includes functionality to process audio signals received using the wireless communications receiver 206 and emit the processed audio signals using the conductors 203 and the speaker 202. In such embodiments, the wireless communications receiver 206 receives wireless signals using one or more of the conductors 203 as an antenna. In various embodiments, upon reception, the signals are passed from the wireless communications receiver 206 to the hearing assistance electronics 205 for processing using connection 215. The processed signals are transmitted to the acoustic receiver using one or more of the same conductors 203 used for receiving the wireless signals.

Figure 3:
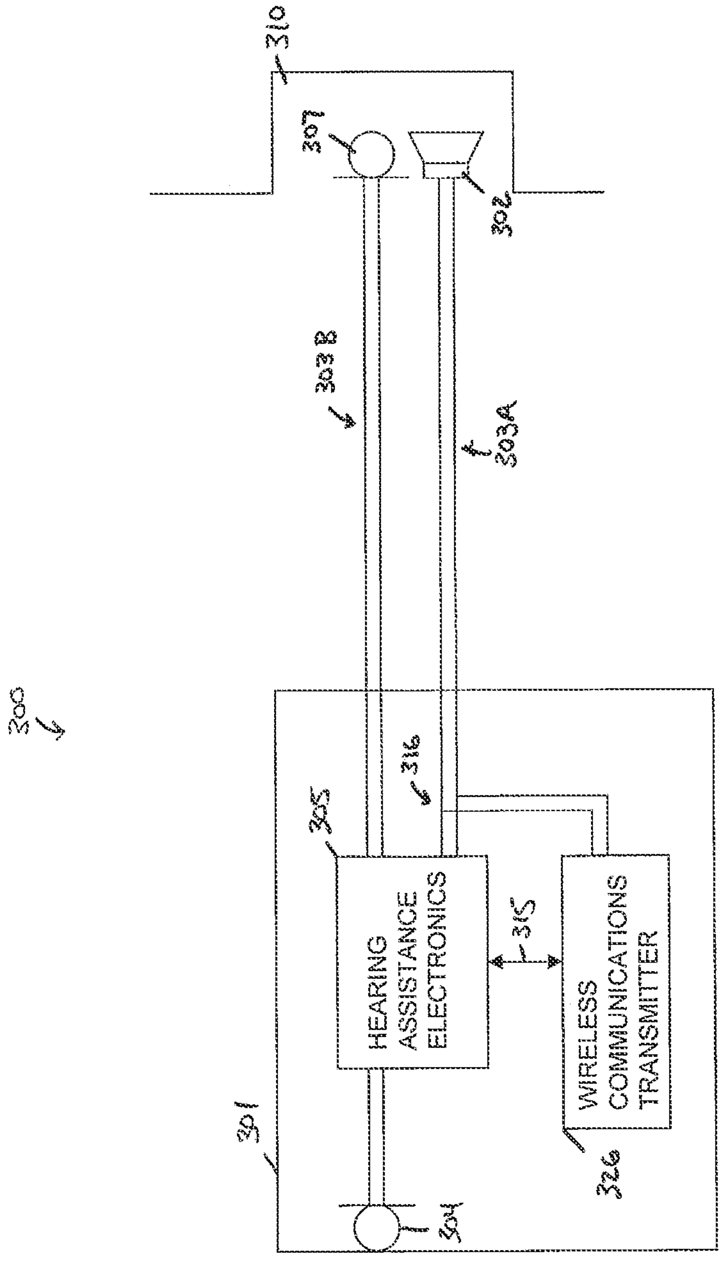
FIG. 3 illustrates a hearing assistance device including a microphone adapted to be worn in a user's ear canal and a wireless communications transmitter according to one embodiment of the present subject matter.

FIG. 3 illustrates one embodiment of a hearing assistance device 300 including a microphone 307 adapted to be worn in a user's ear canal 310. FIG. 3 shows a first housing 301, including hearing assistance electronics 305, a speaker 302, an ear canal microphone 307 and conductors 303A, 303B connecting the speaker 302 and ear canal microphone 307 to the hearing assistance electronics 305. In addition to the hearing assistance electronics 305, the first housing 301 also encloses a first microphone 304 and a wireless communications transmitter 326. The wireless communications transmitter 326 includes a first connection 315 to the hearing assistance electronics 305 and a second connection 316 to at least one of the acoustic receiver conductors 303A. In various embodiments, the first connection 315 between the hearing assistance electronics 305 and the wireless communications transmitter 326 facilitates communication of data between the hearing assistance electronics 305 and the wireless communications transmitter 326. In various embodiments, the second connection 316 facilitates wireless communication transmissions from the hearing assistance device 300 to one or more other devices. In the illustrated embodiment of FIG. 3, the wireless communication transmitter 326 is connected to the hearing assistance electronics 305 and the conductors 303A connecting the hearing assistance electronics 305 to the speaker 302. In various embodiments, the hearing electronics includes functions to transmit audio signals and data using the wireless communications transmitter 326 and the conductors 303A. In such embodiments, the wireless communications transmitter 326 transmits wireless communication signals using one or more of the conductors 303A as an antenna.

Figure 4A:
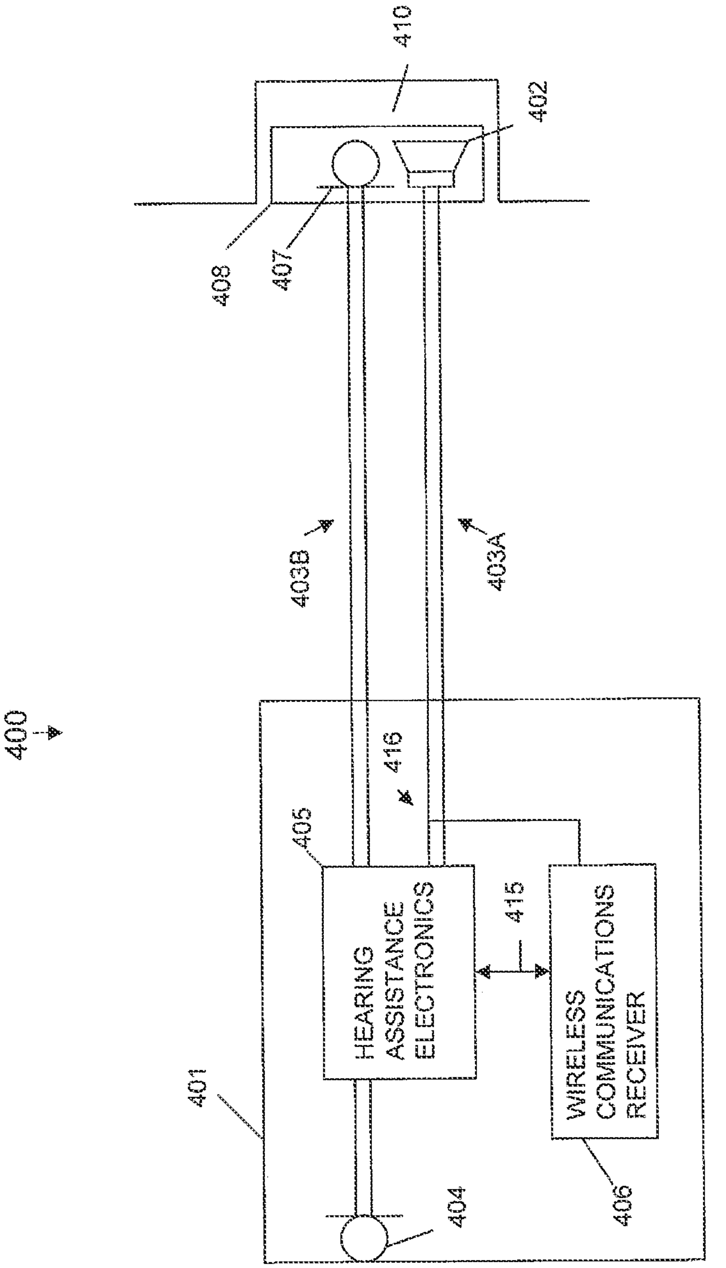
FIGS. 4A and 4B illustrates one embodiments of a hearing assistance device 400 including a second housing adapted to be worn in a user's ear canal according to the present subject matter.
Figure 4B:
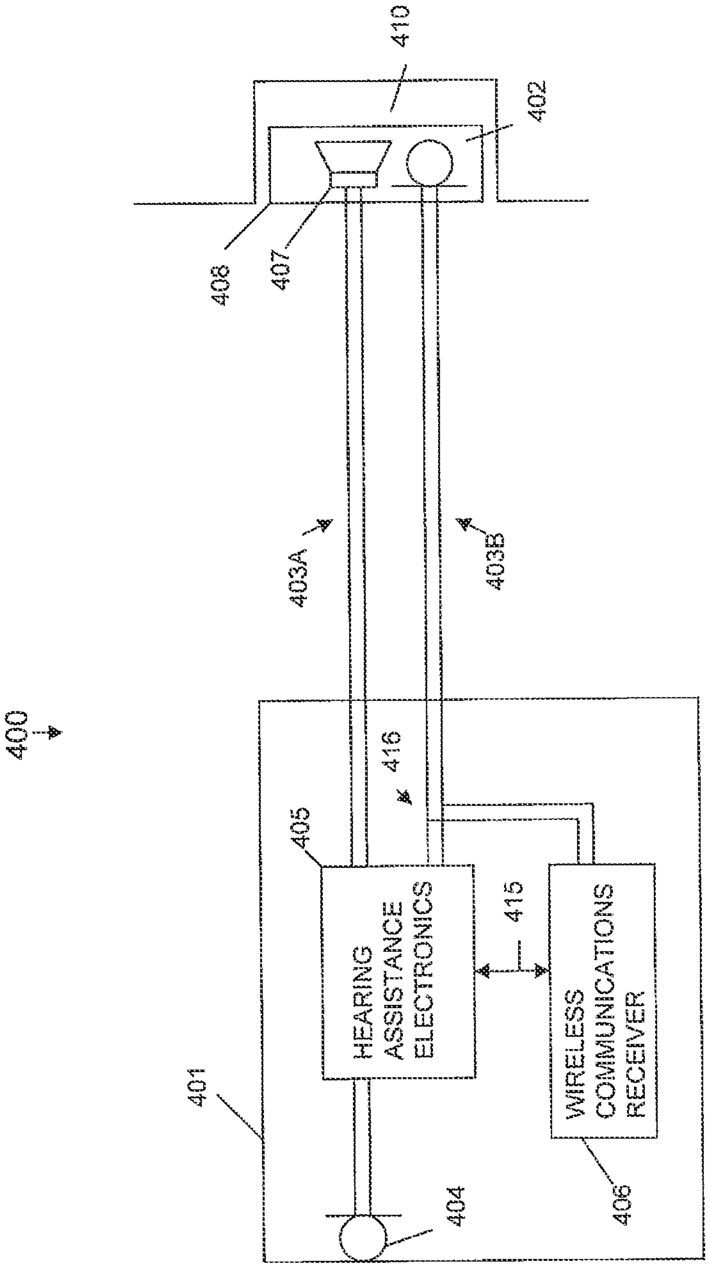

FIGS. 4A and 4B illustrates embodiments of a hearing assistance device 400 including a second housing 408 adapted to be worn in a user's ear canal 410 according to the present subject matter. The illustrated device 400 includes a first housing 401 enclosing a first microphone 404, hearing assistance electronics 405 and a wireless communications receiver 406. The device 400 also includes a second housing 408 with an speaker 402 and a second microphone 407. The second housing 408 is adapted to be worn in a user's ear canal 410. The first microphone 404, second microphone 407, and speaker 402 are connected to the hearing assistance electronics 405. The wireless communications receiver 406 includes a first connection 415 to the hearing assistance electronics 405. In FIG. 4A, device 400 includes a second connection 416 to the conductors 403A connecting the speaker 402 to the hearing assistance electronics 405. In FIG. 4B, device 400 includes a second connection 416 to the conductors 403B connecting the second microphone 407 to the hearing assistance electronics 405.

The second connection 416, between the wireless communications receiver 406 and the hearing assistance electronics 405, allows the wireless communications receiver 406 to use one or more conductors 403A to receive and convert electromagnetic waves into electrical signals for input to the wireless communications receiver 406. Conductors 403A, as illustrated in the embodiment of FIG. 4A, connect the hearing assistance electronics 405 to the speaker 402. As illustrated in the embodiment of FIG. 4B, the second connection 416 allows the wireless communications receiver 406 to use one or more of the conductors 403B, connecting the hearing assistance electronics 405 to the second microphone 407 to receive and convert electromagnetic waves into electrical signals for input to the wireless communications receiver. In various embodiments, the received wireless signals include data for the hearing assistance electronics 405. The data is exchange between the wireless communications receiver 406 and the hearing assistance electronics 405 using the first connection 415.

Figure 4C:
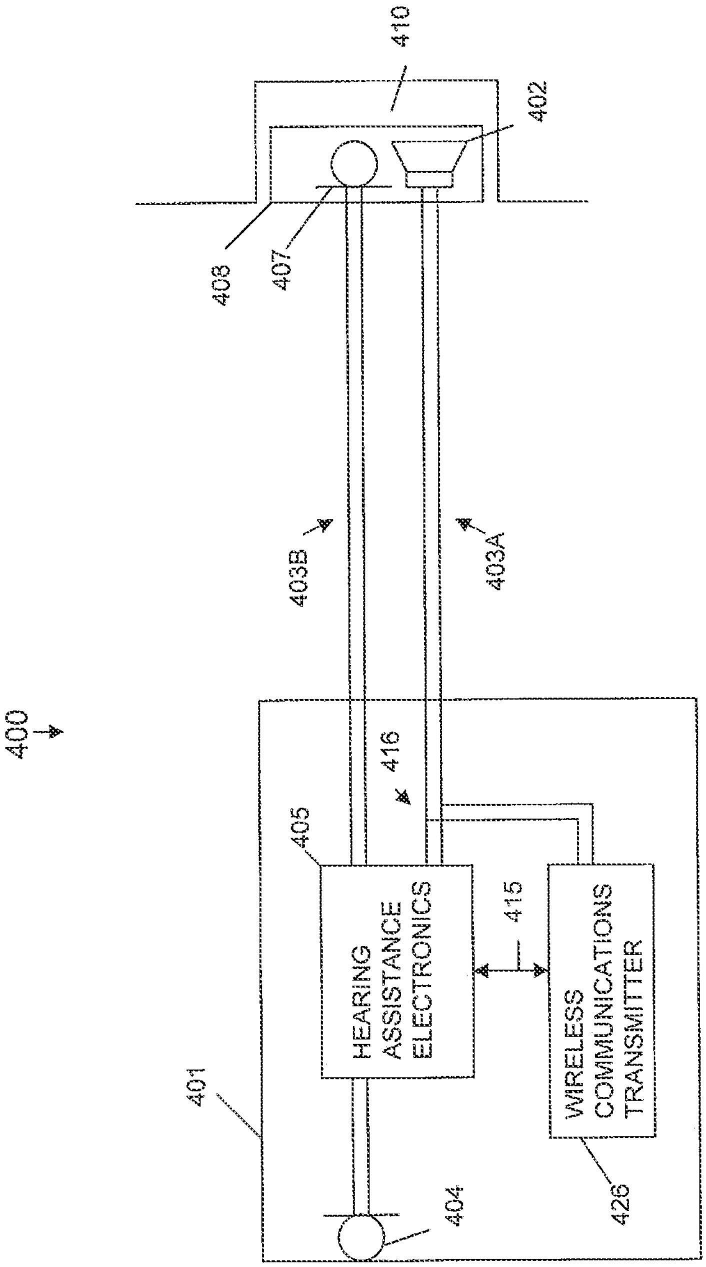
FIGS. 4C and 4D illustrates embodiments of a hearing assistance device including a second housing adapted to be worn in a user's ear canal according to the present subject matter.
Figure 4D:
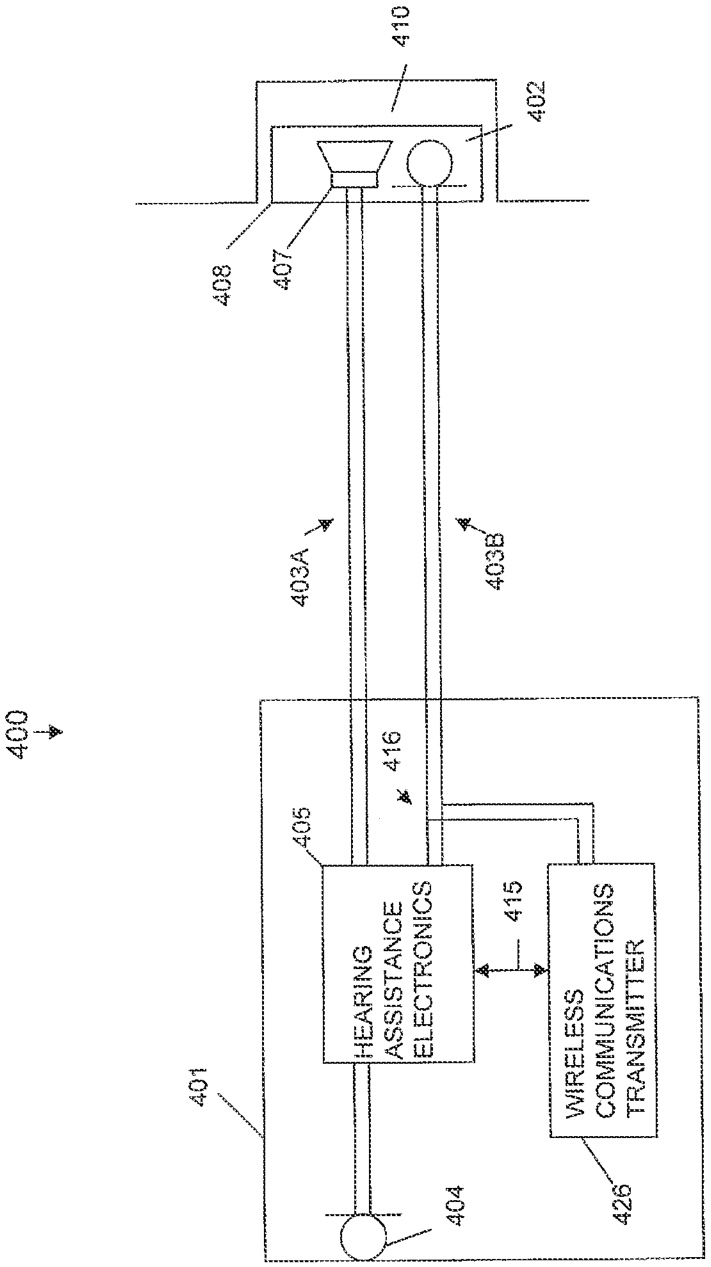

FIGS. 4C and 4D illustrates embodiments of a hearing assistance device 400 including a second housing 408 adapted to be worn in a user's ear canal 410 according to the present subject matter. The illustrated device 400 includes a first housing 401 enclosing a first microphone 404, hearing assistance electronics 405 and a wireless communications transmitter 426. The device 400 also includes a second housing 408 with a speaker 402 and a second microphone 407. The second housing 408 is adapted to be worn in a user's ear canal 410. The first microphone 404, second microphone 407, and speaker 402 are connected to the hearing assistance electronics 405. The second connection 416 allows the wireless communications transmitter to drive one or more of the conductors 403A connecting the hearing assistance electronics 405 to the speaker 402, as illustrated in FIG. 4C. In the embodiment of FIG. 4D, the second connection 416 allows the wireless communications transmitter 426 to drive one or more of the conductors 403B connecting the hearing assistance electronics 405 to the second microphone 407. When driven by the wireless communications transmitter, the one or more conductors convert electrical signals into electromagnetic energy and radiate electromagnetic waves for reception by other devices. In various embodiments, the transmitted wireless signals include data indicative of the operation, data indicative of status or data indicative of operation and status of the hearing assistance device 400. The data is exchange between the wireless communications transmitter 426 and the hearing assistance electronics 405 using the first connection 415.

Figure 4E:
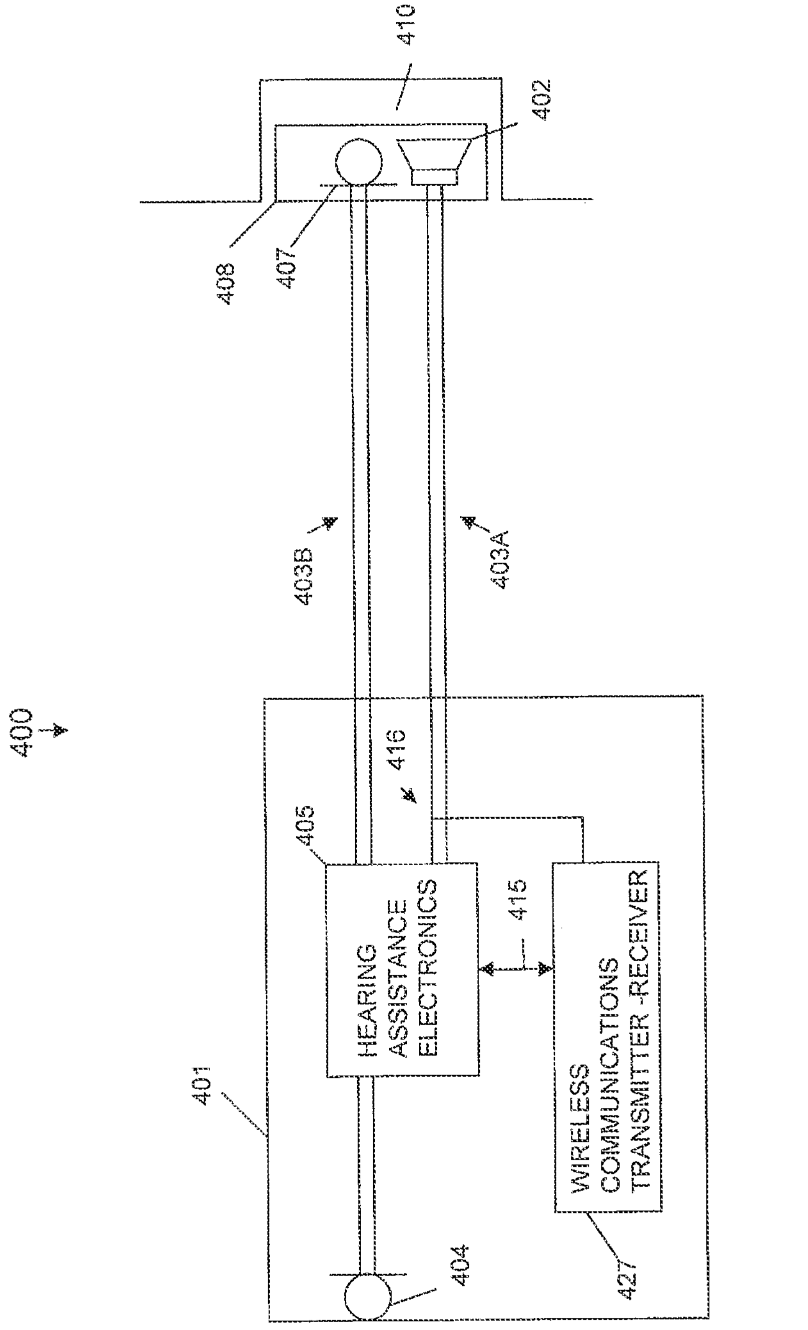
FIGS. 4E and 4F illustrates embodiments of a hearing assistance device including a second housing adapted to be worn in a user's ear canal according to the present subject matter.
Figure 4F:
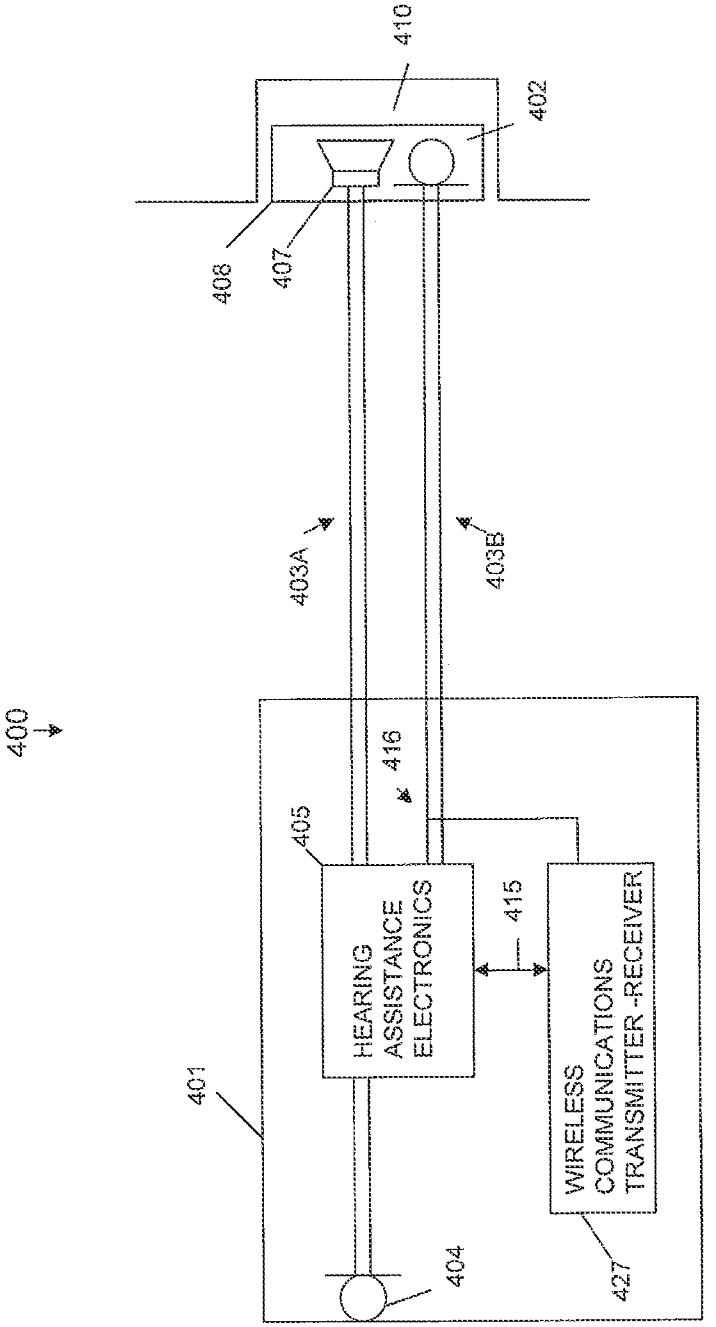

FIGS. 4E and 4F illustrates embodiments of a hearing assistance device 400 including a second housing 408 adapted to be worn in a user's ear canal 410 according to the present subject matter. The illustrated device 400 includes a first housing 401 enclosing a first microphone 404, hearing assistance electronics 405 and a wireless communications electronics including a transmitter and receiver, or transmitter-receiver 427. In various embodiments, the transmitter and receiver are implemented with shared circuitry and are called a 'transceiver'. The device 400 also includes a second housing 408 with a speaker 402 and a second microphone 407. The second housing 408 is adapted to be worn in a user's ear canal 410. The first microphone 404, second microphone 407, and speaker 402 are connected to the hearing assistance electronics 405. The second connection 416 allows the wireless communication transmitter-receiver 427 to monitor and drive one or more of the conductors 403A, as shown in FIG. 4E, connecting the hearing assistance electronics 405 to the speaker 402 to accommodate wireless communications with the one or more other devices. In FIG. 4F, the second connection 416 allows the wireless communication transmitter-receiver 427 to monitor and drive one or more of the conductors 403B connecting the hearing assistance electronics 405 to the second microphone 407 to accommodate wireless communications with the one or more other devices.

In various embodiments, the first housing 401 is a housing adapted to be worn on the ear of a user, such as, an on-the-ear (OTE) housing or a behind-the-ear (BTE) housing. In various embodiments, the second housing 408 is an earmold. In various embodiments, the second housing is a in-the-ear (ITE) housing. In various embodiments, the second housing is an in-the-canal (ITC) housing. In various embodiments, the second housing is a completely-in-the-canal (CIC) housing. In various embodiments the second housing is an earbud.

In FIGS. 4A, 4C and 4E, the wireless communications electronics, 406, 426 and 427, are connected to one of the speaker conductors 403A such that the conductor is a monopole antenna for wireless communications. In various embodiments, the wireless communications electronics 406, 426 and 427, connect to a conductor 403B of the second microphone 407 as a monopole antenna. In FIGS. 4B, 4D and 4F the wireless communications electronics 406, 426 and 427, are connected to two of the second microphone conductors 403B such that the conductors form a dipole antenna for wireless communications. In various embodiments, the wireless communications electronics 406, 426 and 427, are connected to two conductors connected to the speaker 402 as a dipole antenna. In various embodiments, an antenna is implemented in configurations other than a monopole or a dipole antenna, such as, a patch antenna, loop antenna or a wave guide antenna.

In general, electrical conductors can both receive and transmit electromagnetic energy. Depending on the physical configuration of a conductor, or group of conductors functioning as an antenna, the antenna will receive or transmit electromagnetic energy more efficiently at some frequencies than others. Additionally, a conductor, or group of conductors, can transmit and receive multiple electrical signals simultaneously and effectively when the conductors are connected to electronics capable of separating the signals. In various embodiments, the acoustic signal emitted by the speaker 302 is confined to a frequency band distinguishable from the frequency band of interest for wireless communications. In various embodiments, both the wireless communications signals and the audio signals are electrical signals when transmitted using one or more of the conductors connecting the hearing assistance electronics to an acoustic transducer, such as an acoustic receiver. The wireless communication signals do not affect the emitted sound of the receiver. The electrical acoustic signal, although transmitted by the conductors, does not detrimentally affect the wireless communications signals as the frequencies of the acoustic signal are distinguishable from the frequencies of the wireless signals whether the wireless communications electronics are transmitting, receiving or simultaneously transmitting and receiving wireless communications signals. In various embodiments, wireless signal reception, wireless signal transmission and acoustic signal transmissions are multiplexed on one or more conductors connecting the hearing assistance electronics to an acoustic transducer.

Figure 5A:
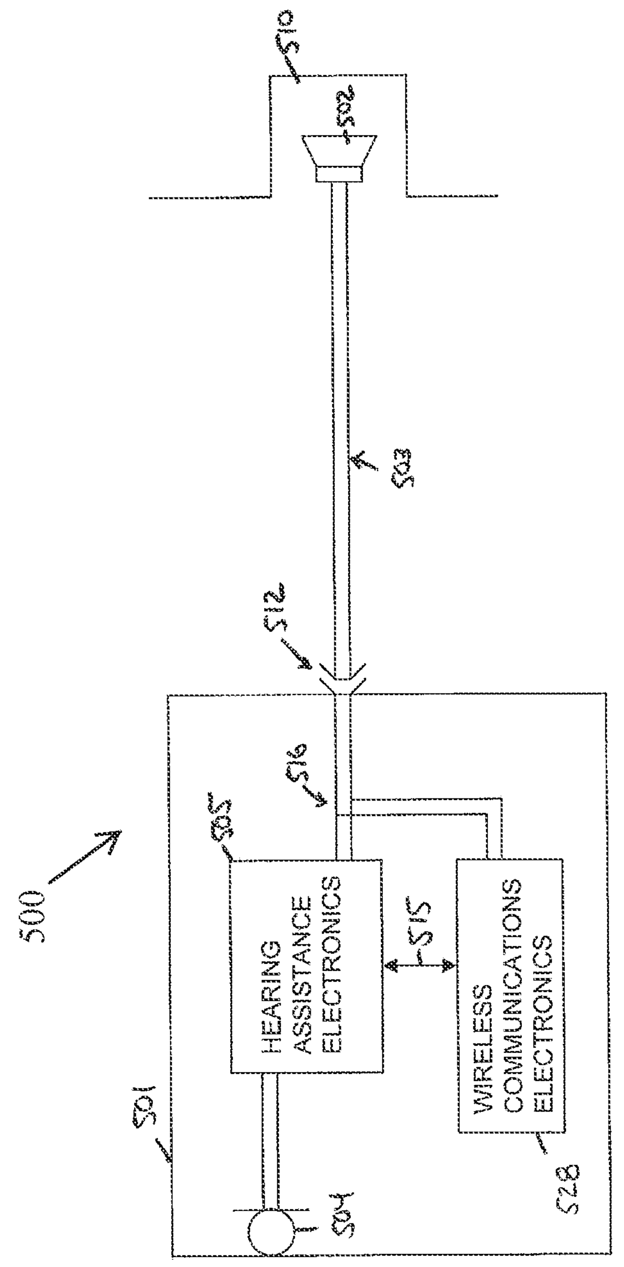
FIG. 5A illustrates a hearing assistance device including a connector with conductive silicone for connecting the hearing assistance electronics to a receiver in the ear canal of a user according to one embodiment of the present subject matter.

FIG. 5A illustrates a hearing assistance device 500 according to the present subject matter including a connector 512 for connecting the hearing assistance electronics 505 to a speaker 502 in the canal 510 of a user. In the illustrated embodiment, the connector 512 allows physical replacement of either the speaker 502 or the hearing aid housing 501 including the enclosed electronics in a simple and time efficient manner. In various embodiments the connector 512 includes conductive silicone for electrically connecting the connector conductors. The illustrated embodiment 500 includes a first housing 501, an acoustic receiver 502, or speaker, adapted for positioning in the ear canal 510 of a wearer and conductors 503 for coupling the receiver 502 to the first housing 501 and the electronics enclosed therein. The electronics enclosed in the first housing 501 include a microphone 504, hearing assistance electronics 505 and wireless electronics 528. The wireless electronics 528 include a first connection 515 to the hearing assistance electronics 505 and a second connection 516 to the conductors 503 connecting the hearing assistance electronics 505 to the receiver 502. The first connection 515 accommodates exchanging data between the hearing assistance electronics 505 and the wireless electronics 528. The second connection 516 allows the wireless electronics 506 to use one or more of the conductors 503 connecting the receiver 502 to the hearing assistance electronics 505 as an antenna for wireless communications between the hearing assistance device 500 and one or more other devices.

Figure 5B:
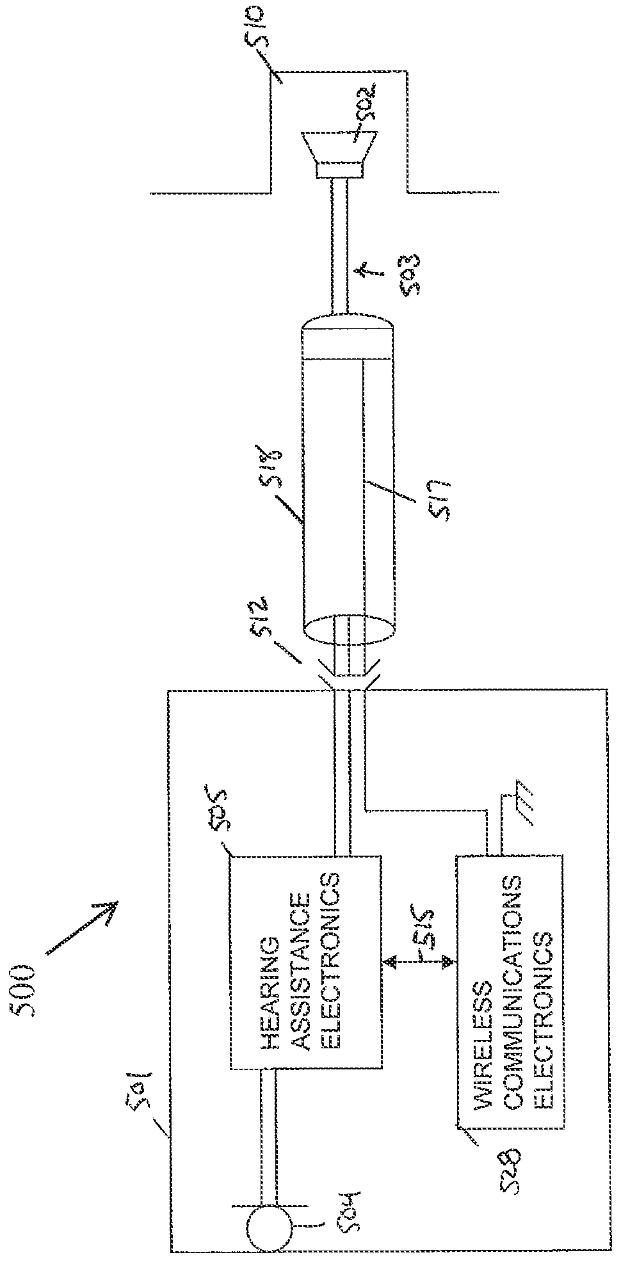
FIG. 5B illustrates a hearing assistance device including a connector with conductive silicone for connecting the hearing assistance electronics to a receiver in the canal of a user and a dedicated antenna conductor for wireless communications according to one embodiment of the present subject matter.

FIG. 5B illustrates a hearing assistance device 500 according to the present subject matter including a connector 512 for connecting the hearing assistance electronics 505 to a receiver 502 in the canal 510 of a user and a dedicated conductor 517 for wireless communications. The illustrated embodiment 500 includes a first housing 501, an acoustic receiver 502, or speaker, adapted for positioning in the ear canal 510 of a wearer and conductors 503 for coupling the receiver 502 to the first housing 501 and the electronics enclosed therein. The electronics enclosed in the first housing 501 include a microphone 504, hearing assistance electronics 505 and wireless communication electronics 528. The wireless communications electronics 528 include a first connection 515 to the hearing assistance electronics 505. The first connection 515 accommodates exchanging data between the hearing assistance electronics 505 and the wireless communications electronics 528. The wireless communications electronics illustrated in the embodiment of FIG. 5B also includes a dedicated antenna conductor 517 for wireless communications. In various embodiments, the antenna conductor extends with the conductors 503 extending from the first housing 501 toward the user's ear canal 510. In various embodiments, the antenna conductor 517 is embedded in a protective insulating layer 518 of the other conductors 503. In various embodiments, the antenna conductor is embedded in the first housing 501. In FIG. 5B, the antenna conductor is configured as a monopole antenna. In various embodiments, the antenna is implemented in configurations other than a monopole antenna, such as, a dipole antenna, a patch antenna, loop antenna or a wave guide antenna. In various embodiments the connector 512 includes conductive silicone for electrically connecting the connector conductors. In various embodiments, the wireless communications electronics 528 are implemented as a wireless communications receiver, a wireless communications transmitter or a combination thereof, including a wireless communications transceiver.

Figure 6A:
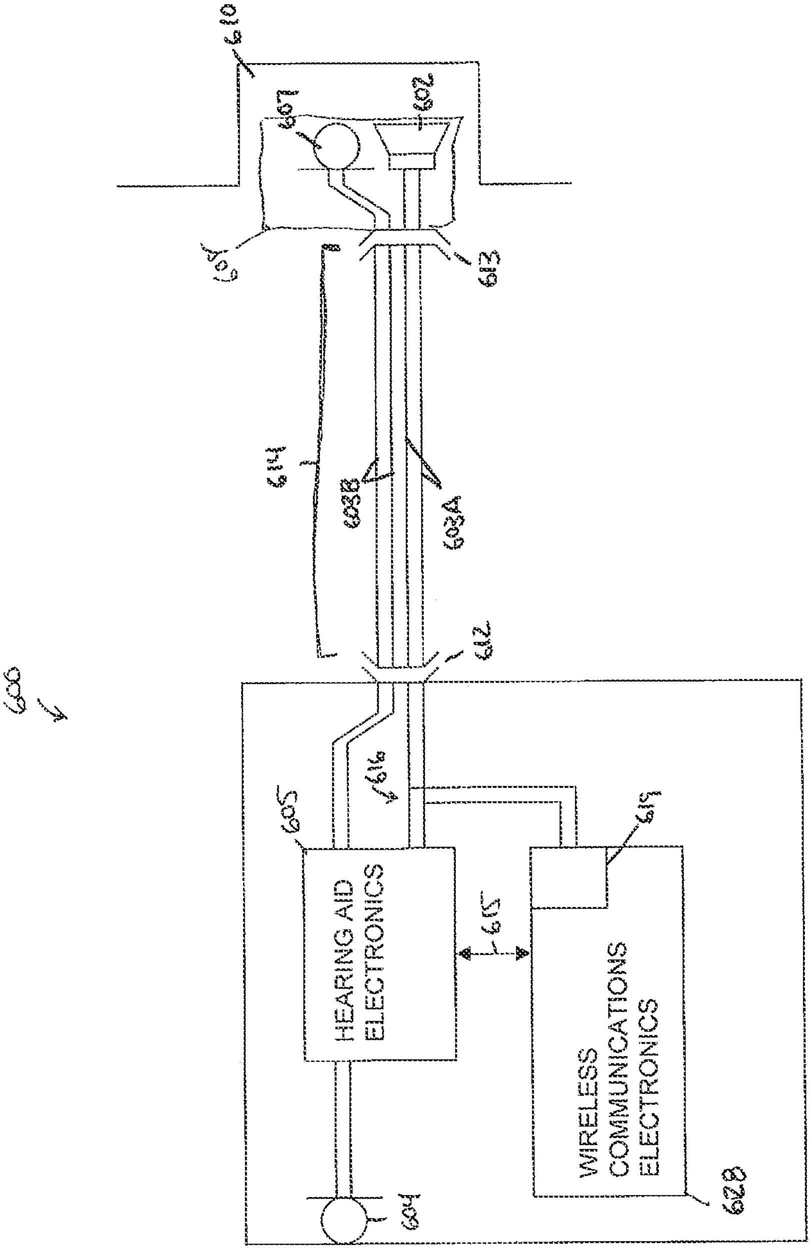
FIG. 6A illustrates a hearing aid including two conductive silicone connectors a second housing including a second microphone adapted to be worn in the ear canal of a user, and a tuning circuit for matching the antenna conductors to the wireless communications electronics according one embodiment of the present subject matter.

FIG. 6A illustrates a hearing aid 600 including two connectors 612, 613, a second housing 608 including a second microphone 607 adapted to be worn in the ear canal 610 of a user, and a tuning circuit 619 for matching the antenna conductors 603A to the wireless communications electronics 628 according one embodiment of the present subject matter. The illustrated device 600 includes a first housing 601 enclosing a first microphone 604, hearing aid electronics 605 and wireless communications electronics 628. The illustrated hearing assistance device 600 also includes a second housing 608 with an acoustic receiver 602 and a second microphone 607. The second housing 608 is adapted to be worn in a user's ear canal 610. The first microphone 604, second microphone 607, and receiver 602 are connected to the hearing aid electronics 605. The wireless communications electronics 628 include a first connection 615 to the hearing assistance electronics 605 and a second connection 616 to the conductors 603A connecting the receiver 602 to the hearing assistance electronics 605. In various embodiments, the first connector 612 includes conductive silicone to electrically connect the conductors between the hearing aid electronics 605 and the second housing 608.

In various embodiments, the acoustic receiver 602 and second microphone 607 are connected to the hearing aid electronics 605 using an intermediate cable 614 and a first 612 and second 613 connector. In various embodiments, one or more of the connectors are conductive silicone connectors. Conductive silicone connectors electrically connect conductors using conductive silicone. For example, in the illustrated embodiment, a first conductive silicone connector 612 connects the conductors of an intermediate cable 614 to corresponding conductors at or near the hearing assistance housing 601. Additionally, a second conductive silicone connector 613 connects the conductors of the acoustic receiver 603A and second microphone 603B to corresponding conductors of the intermediate cable 614. The two silicone connectors allow simple and efficient replacement of either the hearing assistance device housing 601 and the electronics enclosed within, the intermediate cable 614 or the second housing 608 with the second microphone 607 and the receiver 602. In various embodiments, the wireless communications electronics 628 include a tuning circuit 619 to match the antenna conductor, or antenna conductors, to the wireless communications electronics for optimal performance of the wireless communications. Matching the antenna to the wireless electronics 628, such as a transceiver, for example, becomes important where the antenna conductors can be replaced easily and the replacement conductors vary, for example in length, from one to another. The tuning circuit may be implemented in hardware or software or a combination of hardware and software. In various embodiments, the tuning circuit 619 is a fixed tuning component. In various embodiments, the tuning circuit 619 is a variable tuning component, such as a variable shunt capacitor. In various embodiments, the wireless communications electronics 628 are implemented as a wireless communications receiver, a wireless communications transmitter or a combination thereof, including a wireless communications transceiver.

Figure 6B:
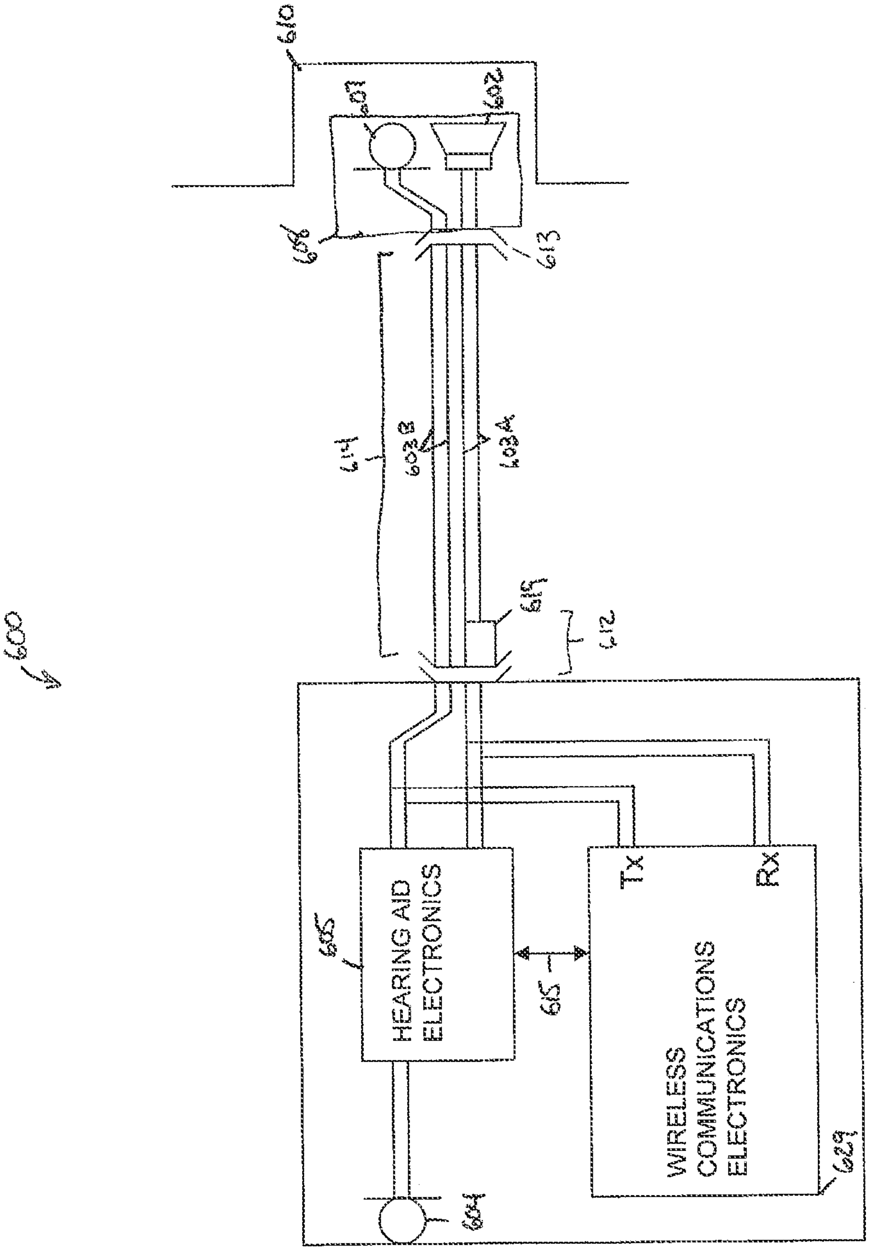
FIG. 6B illustrates one embodiment of a hearing aid with wireless communications capability according to the present subject matter.

FIG. 6B illustrates one embodiment of a hearing aid 600 with wireless communications capability according to the present subject matter. The illustrated hearing aid 600 includes a first housing 601 enclosing a first microphone 604, hearing aid electronics 605 and wireless communications electronics 629. The illustrated hearing aid 600 also includes a second housing 608 with an acoustic receiver 602 and a second microphone 607. The second housing 608 is adapted to be worn in a user's ear canal 610. The first microphone 604, second microphone 607, and receiver 602 are connected to the hearing aid electronics 605. In the illustrated embodiment of FIG. 6B, the conductors 603B connecting the second microphone 607 to the hearing aid electronics 605 are also connected to the wireless communications electronics 629 for use as a transmission antenna. The conductors 603A connecting the acoustic receiver 602 to the hearing aid electronics 605 are also connected to the wireless communications electronics 629 for use as a wireless communications reception antenna. The wireless communications electronics 629 include a first connection 615 to the hearing assistance electronics 605 to exchange data between the hearing aid electronics 605 and the wireless communications electronics 629. In various embodiments, the transmission antenna is formed using, at least in part, the conductors of the acoustic receiver 602 and the reception antenna is formed using, at least in part, the conductors of the second microphone 607.

In the illustrated embodiment of FIG. 6B, the acoustic receiver 602 and second microphone 607 are connected to the hearing aid electronics 605 and the wireless communications electronics 629 using an intermediate cable 614 and a first 612 and second 613 connector. In various embodiments, the first connector, the second connector, or the first and second connector include a conductive silicone component for electrically connecting corresponding conductors.

FIG. 6B illustrates the wireless electronics connected to conductors of both the ear canal microphone 607 and the receiver 602. The microphone conductors 603B are connected to a wireless transmitter output of the wireless communications electronics 629 for use as a wireless communications transmission antenna. The receiver conductors 603A are connected to a wireless receiver input of the wireless communications electronics 629 for use as a wireless communications reception antenna. Using separate conductors for reception and transmission of wireless communications avoid issues inherent in switching between transmission and reception modes using a common antenna. In various embodiments, the ear canal microphone conductors 603B are connected to a wireless communications receiver input of the wireless communications electronics 629 for use as a wireless communications reception antenna. In various embodiments, the receiver conductors 603A are connected to a wireless communications transmitter output of the wireless communications electronics 629 for use as a wireless communications transmission antenna.

In the illustrated embodiment of FIG. 6B, connector 612 includes a tuning component 619 for matching the antenna to, among other things, the wireless communications electronics 629. In general, antenna matching includes modifying the input impedance of the antenna to equal or approximate the circuit feeding the antenna over one or more frequencies in a range of interest. In various embodiments, the tuning component is a fixed tuning component for matching the antenna to the wireless communications electronics. In various embodiments, the tuning component includes a variable tuning component for matching the antenna to the wireless communications electronics. In various embodiments, a tuning component is included in a connector of a transmission antenna. In various embodiments, a tuning component is included in a connector of an antenna providing both transmission and reception functionality to a hearing aid. In various embodiments, separate tuning components are provide for each antenna. Separate tuning components allow for optimal energy transfer of each antenna as well as other characteristics such as noise figure and linearity that may otherwise decrease or compromise performance using a common antenna.

Figure 7A:
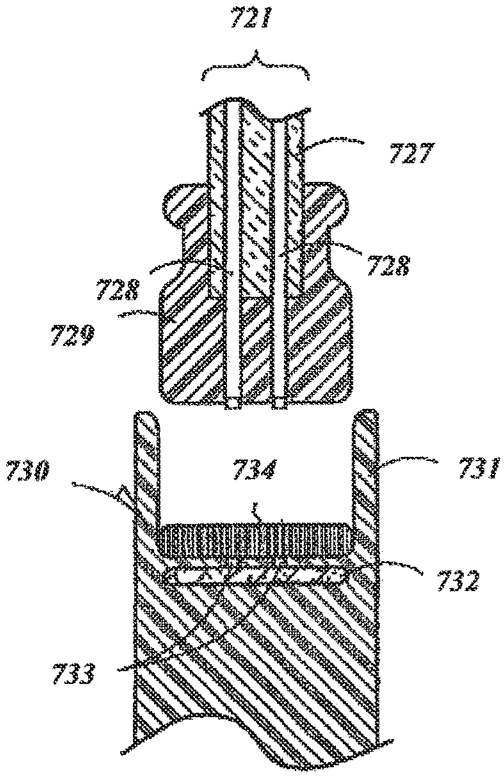
FIGS. 7A and 7B illustrate one embodiment of a conductive silicone connector according to the present subject matter.
Figure 7B:
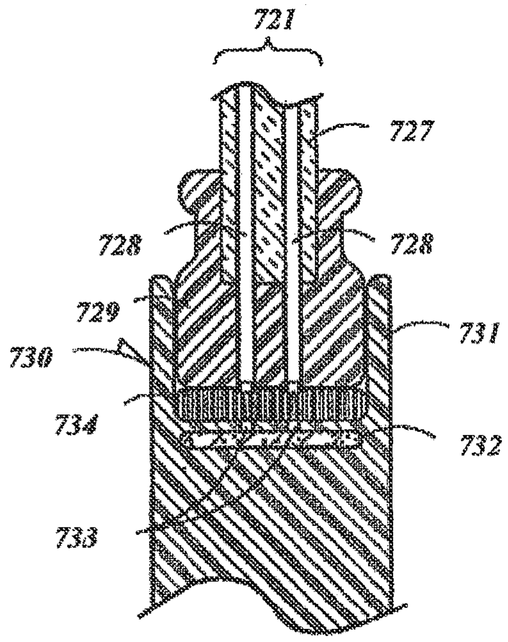

FIGS. 7A and 7B illustrate one embodiment of a conductive silicone connector. FIGS. 7A and 7B illustrate a component of conductive silicone 734 disposed in a connector to provide a reliable electrical connection according to one embodiment of the present subject matter. FIG. 7A illustrates a plug and receptacle type connector. FIG. 7A includes a cable 721, illustrated as a two conductor insulated cable. Insulation 727 isolates the conductors 728 from each other as well as the environment external to the cable. The end of the cable is enclosed in a molded plug 729. The conductors 728 are exposed at the end of the plug 729. The exposed portions of the conductors provide the contact point for the plug of the illustrated connector system. In various embodiments, specialized connectors are attached to the ends of the conductors to provide a larger interface area of contact with the conductive silicone component 234. In various embodiments, the conductors of the receptacle are not limited to exposed traces of a circuit board, but may be, for example, exposed wires of a cable in contact with the conductive silicone component 734.

The receptacle 730 of the illustrated connector system includes insulation material 731, a flexible circuit board 732 with exposed traces 733 and an interface including a conductive silicone component 734. In the illustrated embodiment, insulating material 731 forms the body of the receptacle 730. In various embodiments, the insulation materials used to form the receptacle include mechanical features to engage and retain the insulation materials used to form the plug 729. In the illustrated embodiment, circuit board traces 733 are exposed in the well of the receptacle. The exposed traces 733 of the circuit board 732, integrated into the receptacle 730, are covered by a conductive silicone component 734 disposed in the receptacle 730.

FIG. 7B illustrates the connector embodiment of FIG. 7A engaged to form a connection between the conductors of the plug 728 and conductors of the receptacle 733. In some embodiments, the insulation material of the plug 729 and receptacle 731 include at least one locking mechanism. A locking mechanism includes one or more locking members. In one embodiment of the present subject matter, the locking members align the plug and receptacle to position the conductors correctly in applications where the polarity or the position of plug conductors with respect to receptacle conductors is necessary for proper operation. The locking members allow the plug and receptacle to engage when the respective conductors are correctly aligned.

FIG. 7B illustrates one embodiment of a plug and receptacle 730 when fully engaged. The conductors 728 and exposed traces 733 of the plug and receptacle contact a portion of the conductive silicone 734 disposed in the receptacle to form an electrical connection. In various embodiments, the conductive silicone component 734 is made with alternating layers of conductive and nonconductive silicone. When the connector of FIG. 7B is fully engaged, a pair of mated conductors contact at least one common layer of conductive material in the conductive silicone component to complete the connection between the conductors. At least one insulating layer exists between adjacent conductors such that electrical isolation between each conductor common to the plug or the receptacle is maintained.

Figure 8:
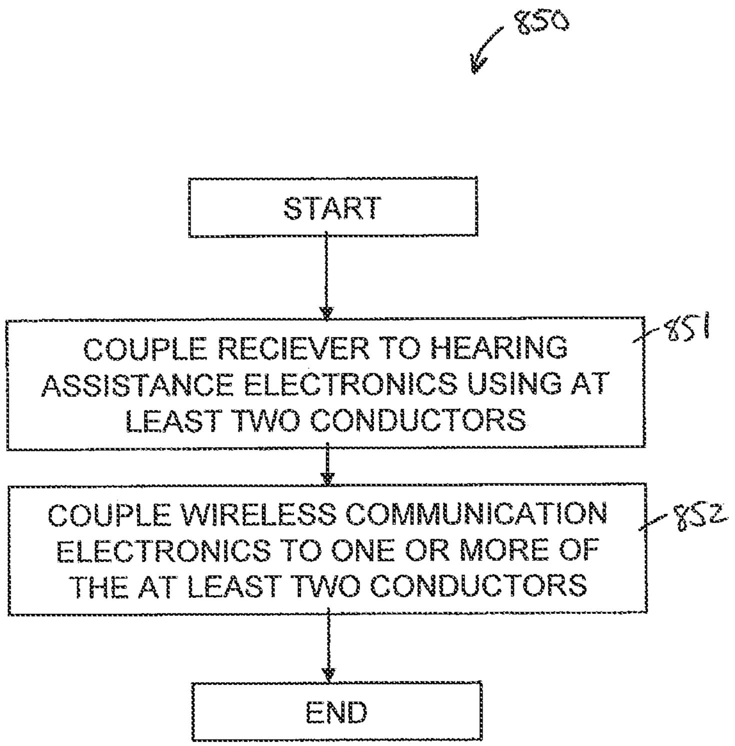
FIG. 8 illustrates one embodiment of a method of manufacturing a hearing assistance device according to the present subject matter.

FIG. 8 illustrates one embodiment of a method of manufacturing a hearing assistance device 850 according to the present subject matter. The process includes coupling a receiver to hearing assistance electronics using at least two conductors 851. The process further includes coupling wireless communication electronics to the conductors connecting the receiver and the hearing assistance electronics 852. In various embodiments, during operation of the hearing assistance device, the conductors are simultaneously used to transmit acoustic signals from the hearing assistance electronics to the receiver and provide an antenna for the wireless communication electronics. In various embodiments, coupling the wireless communication electronics includes coupling a wireless transmitter, coupling a wireless receiver or coupling a wireless transceiver.

The present subject matter includes hearing assistance devices, including, but not limited to, cochlear implant type hearing devices, hearing aids, such as behind-the-ear (BTE), in-the-ear (ITE), in-the-canal (ITC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in-the-canal. It is understood that other hearing assistance devices not expressly stated herein may fall within the scope of the present subject matter.

This application is intended to cover adaptations and variations of the present subject matter. It is to be understood that the above description is intended to be illustrative, and not restrictive. The scope of the present subject matter should be determined with reference to the appended claim, alone with the full scope of legal equivalents to which the claims are entitled.

What is claimed is:

1. A system, comprising:

a first housing including hearing assistance electronics and wireless communications electronics;

a second housing including one or more transducers;

a replaceable cable assembly configured to connect the first housing to the second housing, wherein the cable assembly includes one or more conductors configured to transmit and receive signals between the hearing assistance electronics and the one or more transducers and further configured to function as an antenna for the wireless communications electronics, wherein the first housing includes a tuning component configured for electrically matching the antenna with the wireless communication electronics when the cable assembly is replaced; and an intermediate cable, wherein the intermediate cable includes the tuning component.

2. The system of claim 1, wherein the tuning component is implemented using hardware.

3. The system of claim 1, wherein the tuning component is implemented using software.

4. The system of claim 1, wherein the tuning component is implemented using a combination of hardware and software.

5. The system of claim 1, wherein the tuning component is a fixed tuning component.

6. The system of claim 1, wherein the tuning component is a variable tuning component.

7. The system of claim 1, wherein the tuning component is configured to tune the antenna based on a length of the one or more conductors.

8. The system of claim 1, wherein the second housing includes an in-the-ear (ITE) housing.

9. The system of claim 1, wherein the second housing includes an in-the-canal (ITC) housing.

10. The system of claim 1, wherein the second housing includes a completely-in-the-canal (CIC) housing.

11. A system, comprising:

a first housing including hearing assistance electronics and wireless communications electronics;

a second housing including one or more transducers; and a replaceable cable assembly configured to connect the first housing to the second housing, wherein the cable assembly includes one or more conductors configured to transmit and receive signals between the hearing assistance electronics and the one or more transducers and further configured to function as an antenna for the wireless communications electronics, wherein the replaceable cable assembly includes a tuning component configured for electrically matching the antenna with the wireless communication electronics, and wherein the antenna includes a dipole antenna, a patch antenna, a loop antenna, or a wave guide antenna.

12. The system of claim 11, wherein the antenna includes a monopole antenna.

13. The system of claim 11, wherein the first housing is configured to be worn on an ear of a user.

14. The system of claim 13, wherein the first housing includes an on-the-ear (OTE) housing or a behind-the-ear (BTE) housing.

15. A system, comprising:

a first housing including hearing assistance electronics and wireless communications electronics;

a second housing including one or more transducers;

a replaceable cable assembly configured to connect the first housing to the second housing, wherein the cable assembly includes one or more conductors configured to transmit and receive signals between the hearing assistance electronics and the one or more transducers and further configured to function as an antenna for the wireless communications electronics, wherein the replaceable cable assembly includes a tuning component configured for electrically matching the antenna with the wireless communication electronics; and an intermediate cable, wherein the intermediate cable includes the tuning component.

* * * * *